(12) United States Patent
Daruwalla

(10) Patent No.: US 8,874,696 B1
(45) Date of Patent: Oct. 28, 2014

(54) COMMON CACHE SERVICE

(75) Inventor: Gev Daruwalla, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 612 days.

(21) Appl. No.: 12/971,041

(22) Filed: Dec. 17, 2010

(51) Int. Cl.
*G06F 15/16* (2006.01)

(52) U.S. Cl.
USPC ........... 709/219; 709/201; 709/203; 709/217; 709/218; 709/230

(58) Field of Classification Search
CPC ............ H04L 12/1868; H04L 41/0213; H04L 41/046; H04L 41/0893; H04L 43/0811
USPC .......................... 709/201, 203, 217–219, 230
See application file for complete search history.

(56) References Cited

U.S. PATENT DOCUMENTS

| | | | |
|---|---|---|---|
| 5,878,218 A * | 3/1999 | Maddalozzo et al. ........ | 709/213 |
| 6,393,569 B1 * | 5/2002 | Orenshteyn ....................... | 726/4 |
| 6,609,126 B1 * | 8/2003 | Smith et al. ........................... | 1/1 |
| 6,742,043 B1 * | 5/2004 | Moussa et al. ................. | 709/232 |
| 7,206,844 B2 * | 4/2007 | Gupta et al. ................... | 709/226 |
| 7,565,415 B1 * | 7/2009 | Markowitz et al. ........... | 709/219 |
| 7,725,530 B2 * | 5/2010 | Sah et al. ........................ | 709/203 |
| 7,725,611 B2 * | 5/2010 | Ohashi et al. ...................... | 710/7 |
| 8,275,790 B2 * | 9/2012 | Fredricksen et al. .......... | 707/782 |
| 2008/0270741 A1 * | 10/2008 | Tremaine ....................... | 711/206 |
| 2010/0083006 A1 * | 4/2010 | So et al. ......................... | 713/193 |
| 2011/0051275 A1 * | 3/2011 | Ha et al. ........................... | 360/48 |

* cited by examiner

*Primary Examiner* — Emmanuel L Moise
*Assistant Examiner* — Farzana Huq
(74) *Attorney, Agent, or Firm* — Schmeiser, Olsen & Watts LLP

(57) ABSTRACT

Described is a common cache service for use in a storage system. The common cache service operates between client applications and a command service that provides access to a data store. The client applications, command service, and common cache service may communicate via a communications protocol. A client application issues a request to a communications protocol port to access the data store. The common cache service receives the request for data at the communications protocol port from the client application, and returns requested data to the client application if the requested data is stored by the common cache service. Otherwise, the request is passed by the common cache service to another communications protocol port to the command service to retrieve the data from the data store.

12 Claims, 8 Drawing Sheets

COMMON CACHE SERVICE

FIELD OF THE INVENTION

The present invention relates generally to caching. More particularly, the invention relates to caching as it applies between multiple client applications and backend resources in storage systems.

BACKGROUND

Today's enterprise data centers store ever-larger amounts of business critical data that must be immediately and continuously available, and highly reliable. The storage systems developed to provide these solutions become increasing complex as development cycles shorten and hardware and software resource bounds are approached. Typical ways of implementing certain functions sometimes need to be optimized.

One example relates to the way in which middleware client applications are implemented in certain storage control systems. Such applications often implement their own session caches. This is often deemed a requirement for performance reasons. However, a number of performance and scalability issues are presented by this approach. For instance, each session cache that is implemented uses significant memory space, thus limiting memory space available to all sessions in the storage control space. Further, the need to provide a session cache for a client application slows the development and deployment time for that application. Furthermore, each local session cache is likely caching a good portion of the same data; thus, cached data redundancy is occurring in an environment where memory space is a commodity. Further, each local session cache is loading the storage system with redundant read requests, placing an unnecessary request load on the system. In addition, each local session cache registers for indications for provision of updates to the data store. These indications and updates must be provided to each individual cache, even though the updates may be redundant, placing yet a further load on the system. It is desirable to provide a new approach to caching for client applications in storage control systems.

SUMMARY

In one aspect, the invention features a method of responding to application requests for data in a storage system by providing a common cache service. The common cache service is coupled between a plurality of client applications and a command service. The command service provides access to a data store. The client applications issue requests to access data. The method includes the steps of receiving by the common cache service a request for data from a client application, and returning requested data to the client application if the requested data is stored by the common cache service. Otherwise, the request is passed to the command service to retrieve the data from the data store and return it to the client application. The retrieved data can be stored in the common cache when it is retrieved.

In accordance with an embodiment the client applications, command service, and common cache service communicate via a communications protocol. The client applications issue requests to access data by issuing communications protocol requests to a communications protocol port. The common cache service receives a request for data from a client application by receiving a communications protocol request on a communications protocol port. The step of passing the request to the command service to retrieve the data from the data store may include passing a communications protocol request to the command service on a different communications protocol port.

Furthermore, the common cache service may be located within the control portion of a storage system, or remotely. The communications protocol may XML based in accordance with an embodiment.

In accordance with another aspect, the invention features a program product comprising a non-transitory computer readable medium having embodied therein a computer program for storing data. The program product includes a common cache service coupled between a plurality of client applications and a command service. The command service provides access to a data store. The client applications issue requests to access data. The program product includes logic for receiving by the common cache service a request for data from a client application. The program product further includes logic for returning requested data to the client application if the requested data is stored by the common cache service; otherwise, the request is passed to the command service to retrieve the data from the data store and return it to the client application. The program product can further store the retrieved data in the common cache service.

According to a further aspect, the client applications, command service, and common cache service communicate via a communications protocol, and the client applications issue requests to access data by issuing communications protocol requests to a communications protocol port.

The program product logic for receiving by the common cache service a request for data from a client application can include logic for receiving a communications protocol request on a communications protocol port. More specifically, the program product logic for receiving by the common cache service a request for data from a client application can include logic for receiving a communications protocol request on a communications protocol port. The program product logic for passing the request to the command service to retrieve the data from the data store can include passing a communications protocol request to the command service on a different communications protocol port.

Furthermore, the common cache service of the program product may be located within the control portion of a storage system, or may be located remotely.

In accordance with a further aspect, a storage system includes a control station coupled to a backend. The backend includes a data store. The control station includes a common cache service coupled between a plurality of client applications and a command service, the command service providing access to the data store on the backend. The client applications issue requests to the command service to access the data store. The common cache service is operable to receive a request for data from a client application via a communications protocol; return the requested data to the client application if the requested data is stored by the common cache service; otherwise, pass the request to the command service via the communications protocol to retrieve the data from the data store, store the retrieved data in the common cache service, and return the data to the client application.

BRIEF DESCRIPTION OF THE DRAWINGS

The advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Generally, the invention features a common cache service for use in a storage system. The common cache service is coupled between a plurality of client applications and a command service. The command service provides access to a data store in the storage system. The client applications issue requests to the command service to access the data store. The common cache service receives a request for data from a client application, and returns requested data to the client application if the requested data is stored by the common cache service. Otherwise, the request is passed to the command service to retrieve the data from the data store. In accordance with an embodiment the client applications, command service, and common cache service communicate via a communications protocol, as will be further described. The common cache service provides a common cache for use by storage system applications so that separate session caches per application need not be developed and maintained.

Figure 1:
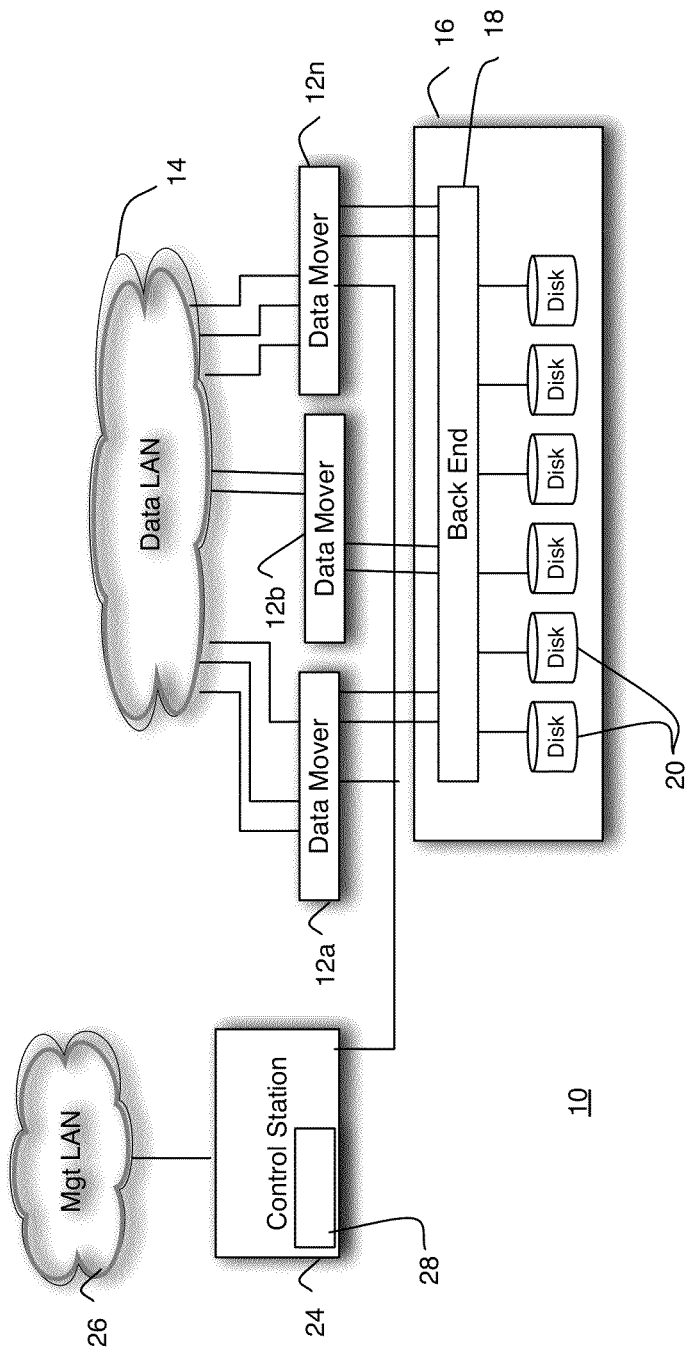
FIG. 1 is a functional block diagram of an embodiment of a storage system including a control station and a backend.

In FIG. 1 there is shown an embodiment of a storage system 10 in which aspects of the invention may be deployed. The storage system 10 shown is an example of a one of the many configurations available within the Celerra® product family from EMC Inc. of Hopkinton, Mass. The Celerra product family covers a broad range of storage platforms, configurations and capabilities that scale across all ranges of networked storage. The family consists of common building blocks.

As shown, data movers 12a,b . . . n move data back and forth between a LAN 14 and a back-end 16 including backend channel connections 18 to storage disks 20, also herein referred to as a data store 20. A control station 24 (CS) is the management station for the system 10. The storage system 10 is configured and controlled via the CS 24. The CS 24 is shown coupled to a management LAN 26. The CS 24 also has a media slot 28 for accepting software media such as DVD, CD, etc.

Figure 2:
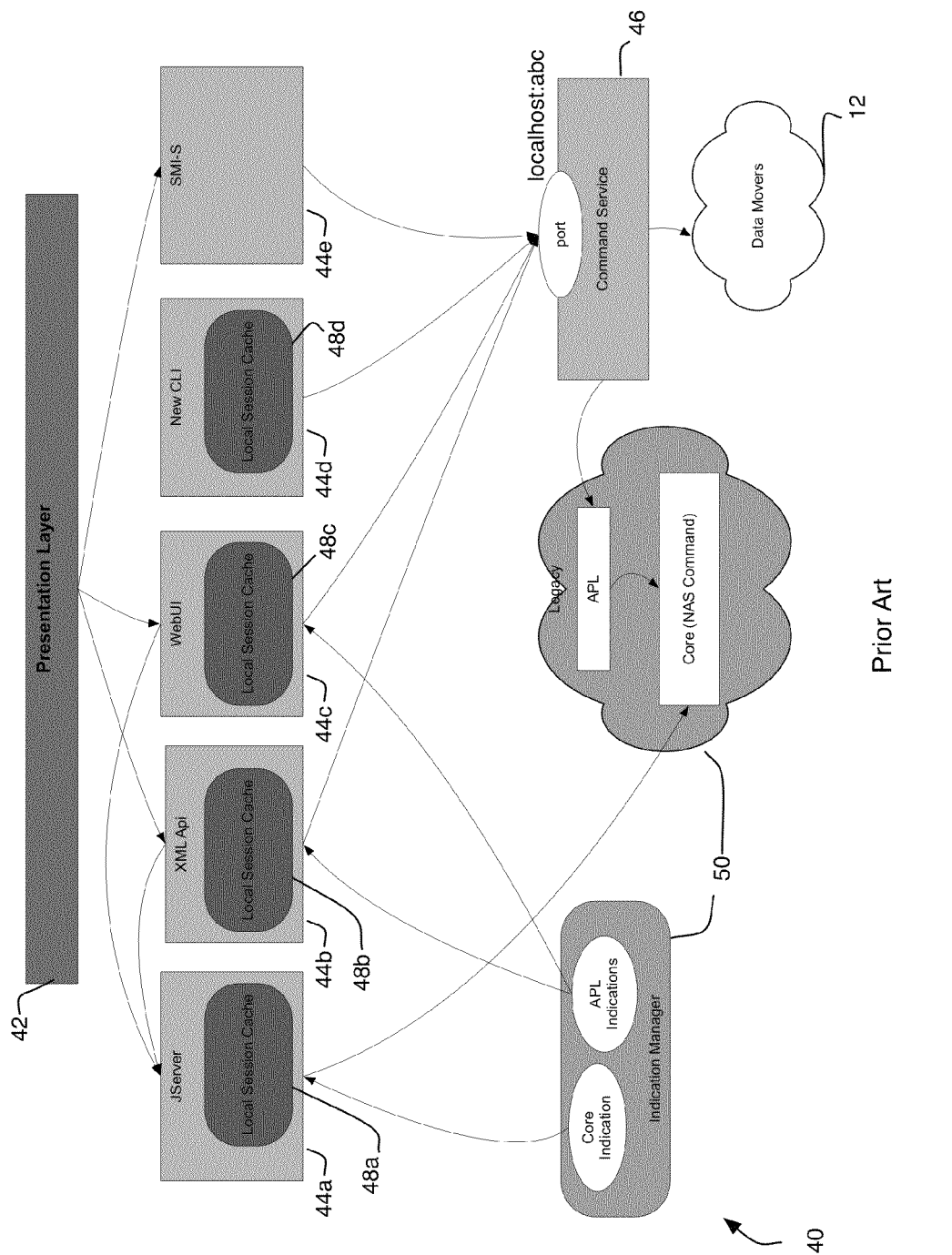
FIG. 2 is a block diagram showing a prior art implementation of a control station of FIG. 1.

As shown more particularly in FIG. 2, the CS 24 runs management and control application software 40 to manage the CS 24 of the storage system 10. The management and control application software 40 includes a presentation layer 42. The presentation layer 42 interfaces to certain client applications (e.g. "middleware") 44a, b, c, d, e, collectively referred to as client applications 44, that gather data from the backend 16 (FIG. 1) via data movers 12 for presentation to software layers above the presentation layer 42, and send data to the backend 16 via the data mover 12 from the presentation layer 42. Examples of client applications in the embodiment shown are:

WEB-UI 44c which is a Server Component for the Celerra Manager;

JServer 44a which provides a Statistical Data Collection Engine;

XML-API 44b which provides an XML based API for configuration management to Clients;

SMI-S 44d which provides a Storage Management Standard based interface to system Configuration and Faults.

CLI 44e which provides a command line interface for system Configuration.

The client applications 44 access the data movers 12 via a command service 46. (Some client applications such as 44a might use the command service 46 indirectly via other entities 50.) More particularly, when one of the client applications 44, for example XML API 44b, needs data from the backend 16 (FIG. 1), it sends a list request for the data via a command protocol request—for instance a protocol command on an XML port. The command service 46 resides at this XML port, and services this request by accessing the backend 16 via data movers 12. The command service 46 returns the data to the client application 44b. This same read request could be repeated many times by the client application 44b, and the command service 46 would repeat the backend access and respond to the client application 44b with the same data response. In order to avoid repeated requests for the same data, and the attendant delay involved, the client application 44b implements a local session cache 48b. Now, if a request is issued multiple times, it can under proper conditions be serviced from the cache 48b instead of the command service 46. But note that local session cache 48b takes significant memory space on CS 24 to implement.

Now consider that client applications 44 all have the same issue. Each client Application 44 has the same need to implement a local session cache. But each client Application 44 is a unique implementation having unique cache requirements and each is written in its particular programming language. So each time a client application 44 is developed, a new session cache 48 must be developed specifically for that client application 44. As shown in FIG. 2, clients 44a, 44b, and 44c are shown as implementing local session caches 48a, 48b, and 48c respectively, the local session caches referred to collectively as 48.

The scalability and performance issues associated with the arrangement of FIG. 2 are several fold. Each local session cache 48 that is implemented uses significant memory space in the CS 24, thus limiting memory space available to all sessions in the CS 24. Further, the need to provide a session cache 48 for a client application 44 slows the development and deployment time for that application 44. Furthermore, each local session cache 48 is likely caching a good portion of the same data; thus, cached data redundancy is occurring in an environment where memory space is a commodity. Further, each local session cache 48 is loading the command service 46 with its redundant read requests, placing an unnecessary request load on the command service 46. In addition, each local session cache 48 registers for indications for provision of updates to the data store 20 within the backend 16. These indications and updates must be provided to each individual cache, even the updates provide redundant data, placing yet a further load on the system. In such an environment, when it comes time to add a new client application 44, more memory space must be allocated to implement yet another local session cache 48, more time must be allocated to implement it, and more loading on the command service 46 will occur. Eventually there will be no memory space left to support the additional cache sessions 48.

Figure 3:
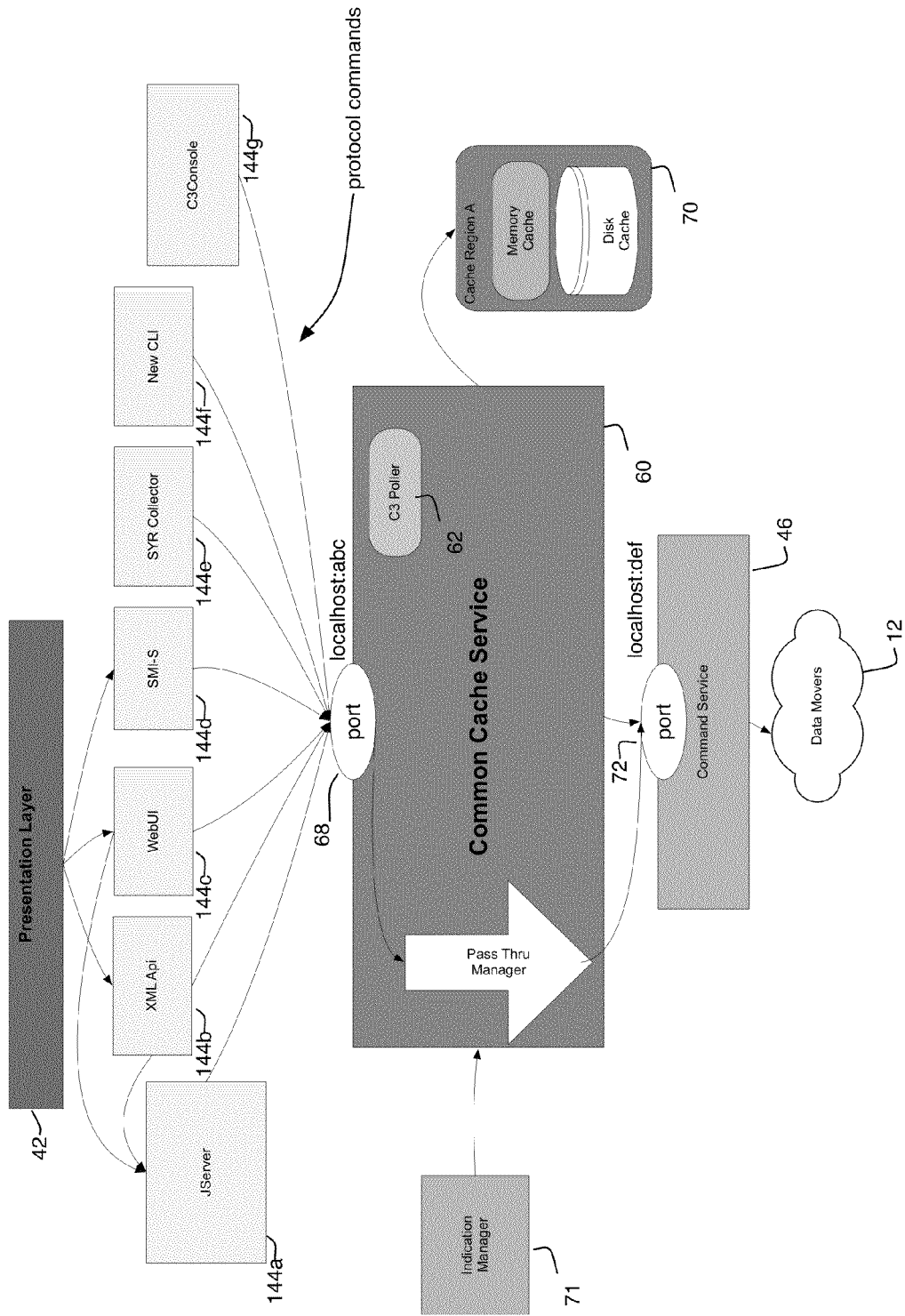
FIG. 3 is a block diagram of a control station embodying a common cache service in accordance with the invention.

Referring to FIG. 3, in accordance with the invention, a standalone common caching service 60 (also referred to for convenience as "common cache" 60) solves these scalability and performance issues. In the embodiment of FIG. 3, the CS 24 is shown having a common cache service 60 positioned between the client applications 44 and the command service 46. The common cache service replaces the individual session caches 48. The command service 46 provides access to the data store 20 on the backend 16 via the data movers 12. The client applications are now referred to as 144a . . . n in case interface changes are made, though the common service 60 can be implemented transparently to operate with prior art client applications 44a . . . n, and thus client applications 144a . . . n may be the same or different from client applications 44a . . . n.

Generally, the common cache service 60 receives a request for data from the client application 144. The common cache service 60 returns the requested data to the client application 144 if the requested data is stored by the common cache service 60. Otherwise, the request is passed from the common cache service 60 to the command service 46 to retrieve the data. The client applications 144, command service 46, and common cache service 60 communicate via a communications protocol 62.

The communication protocol 62 is used by the client applications 144 to communicate with the common cache 60 as it was previously used to communicate with the command service 46. In essence, the common cache 60 is logically deployed as a proxy component to the command service 46. That is, where the clients 44 saw the command service 46 before (FIG. 2), they see the common cache 60 now. Generally, protocol command requests from client applications 44 that used to be received by the command service 46 are now received by the common cache service 60. If the information requested resides in the common cache 60, the common cache 60 returns the information. If the information requested does not reside in the common cache 60, or the request is not of the type that would be cached, the common cache service 60 forwards the information via the command protocol 62 to the command service 46, which handles the request as previously described. For instance, the request may be forwarded to the data movers 12 so data may be retrieved.

More particularly, communications protocol command requests 66 are received at the common cache service 60 from the client applications 144 at a communications protocol port 68, herein shown for example as localhost:abc. Communications protocol requests 70 are received by the command service 46 from the common cache service 60 at a different communications protocol port 72, herein shown for example as localhost:def. In accordance with an embodiment, localhost:abc is the same port that was previously employed in the original embodiment of FIG. 2 by the command service 46. Thus, the addition of the common cache service 60 between the client applications 144 and the command service 46 is performed in a manner transparent to the client applications 144.

The common cache service 60 contents must be updated as the data store 20 contents change. So, also shown in FIG. 3 is an indications manager 71. The indications manager 71 is a session that listens for updates from the command service 46 and notifies the common cache session 60 that the data store 20 has changed. The common cache session 60 uses the information from the indications manager 71 to keep the contents of the common cache service 60 current with the data store 20.

In accordance with advantages of the invention, the common cache service 60 replaces the caching function of the session caches 48 of the prior art (FIG. 2). Client applications 144 that implement session caches 48 no longer need to do so. Thus they have the option to partly or wholly remove them. In accordance with another advantage of the invention, when a new client application 144 is developed, no new session cache 48 need be developed and implemented. Memory usage as applications are added is concomitantly decreased, redundant cached information is decreased, and requests to the command service 46 for the same information are decreased. Indication traffic is decreased to the common cache from 60 the multiple session caches 48.

The common cache 60 can be coupled to a backup or overflow auxiliary memory 70. Thus, if the common cache 60 temporarily runs out of memory space, it can temporarily increase cache size by overflowing cache space to the auxiliary memory 70. This offers a performance advantage over having to continue through the command service 46 to the data movers 12. The auxiliary memory 70 may include memory, flash memory, hard disk storage, etc.

Figure 4:
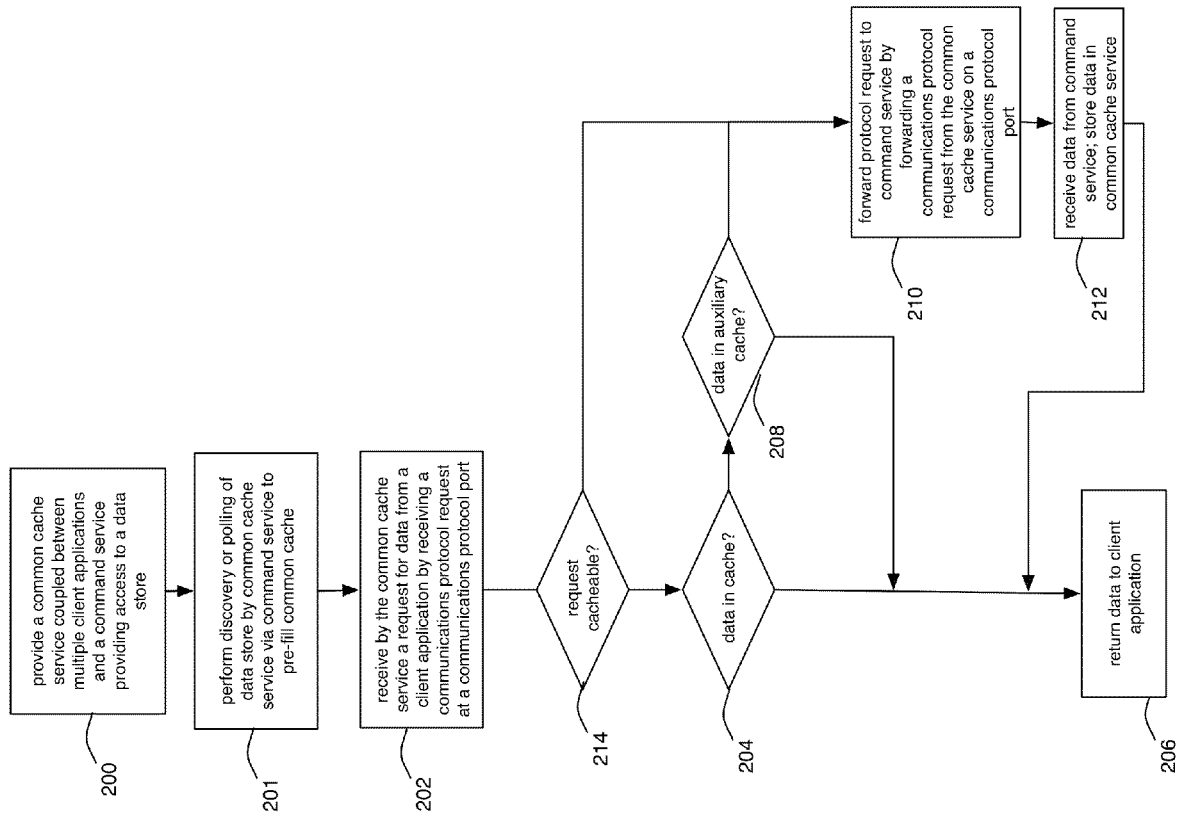
FIG. 4 is a flow diagram of an embodiment of a process performed by a control station employing a common cache service in accordance with the invention.

Referring now to FIG. 4, there is shown the method by which the invention operates in the CS 24. Accordingly a common cache session 60 is provided that is coupled between multiple client applications 144 and a command service 46. The command service 46 provides access to a data store 20. (step 200). The common cache service 60, using polling session 62, may initially perform discovery or polling of the data store 20 via the command service 46 in order to pre-fill the common cache 60 (step 201). At some point, a request for data is received by the common cache service 60 from a client application 144 (step 202). In accordance with an embodiment, the request is a communications protocol request received at a communications protocol port 68. If the requested data is present in the common cache service 60 (step 204), it is returned to the client application 144 (step 206). In accordance with an embodiment, if the requested data is not present in the common cache service 60, an auxiliary cache 70 is checked (step 208). If the requested data is present in the auxiliary cache service it is returned to the client application (step 206). If the requested data is not present in the common cache service 60 or its auxiliary cache 70, the request is forwarded to the command service (step 210). In accordance with an embodiment, the request is forwarded via a communications protocol to a communications protocol port 72. The requested data is returned from the command service 46, stored by the common cache service 60 for future use, and sent from the common cache service 60 to the client application 144 (step 212).

In accordance with an embodiment of the common cache service 60, a communications protocol request received may be checked to see if it is a cacheable request. For example, in the storage system 10, if a request is of a static query type, it is advantageously cached. But If a request is of a critical non-static create/delete/update type, it is desirable to send this type of request directly to the command service 46, without passing through the common cache 60. Thus, in FIG. 4, at optional step 214, the request is checked to see if it is of the cacheable type. If not, it is forwarded directly through the common cache service 60 to the command service 46.

Figure 5:
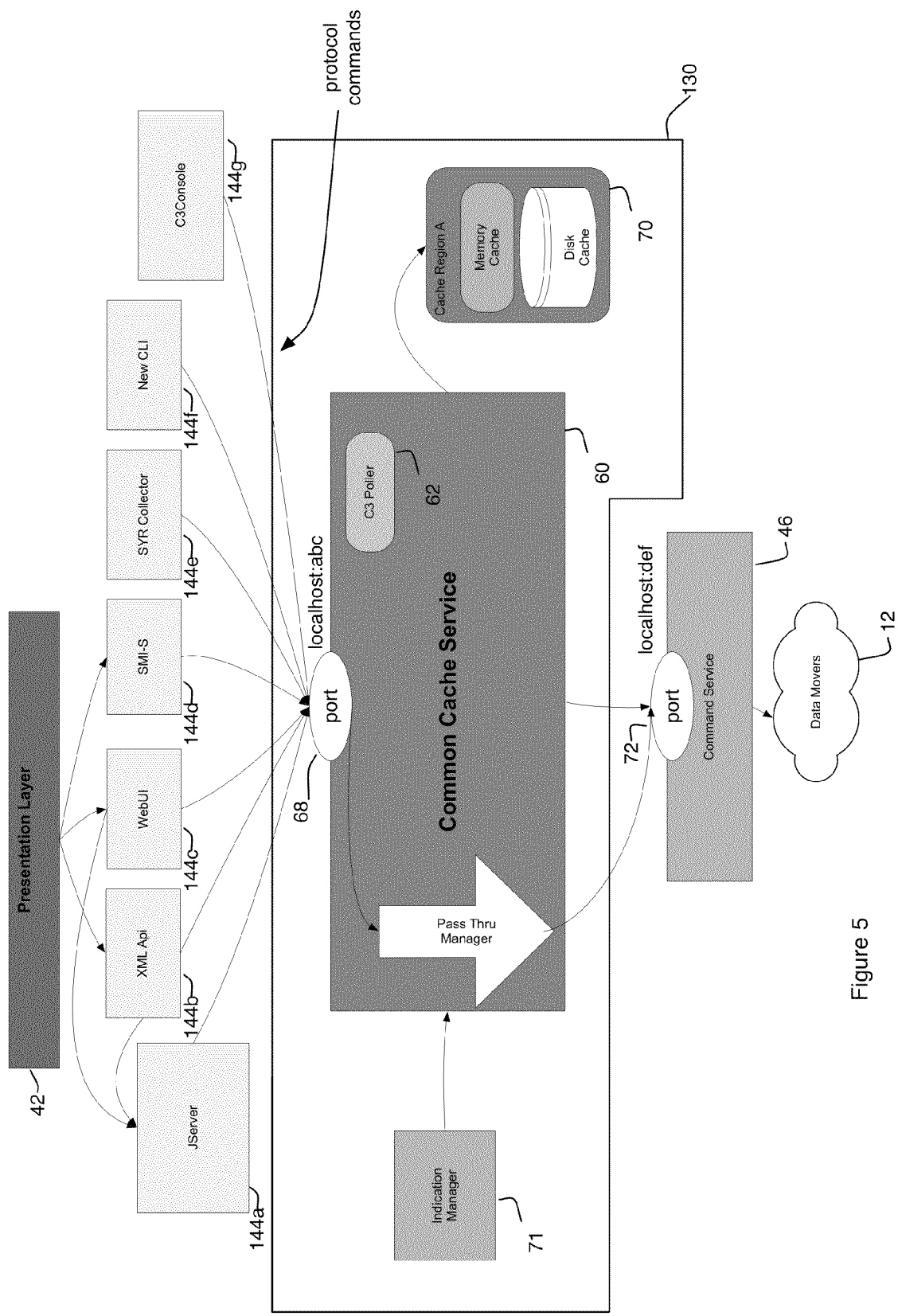
FIG. 5 is a block diagram of a control station embodying a particular implementation a remote common cache service n accordance with the invention.

In accordance with a further aspect of the invention, it is noted that, since the common cache 60 is a service, it can be located remotely. For instance, as shown in FIG. 5, the common cache service 60 could be located on a server or PC 130 or the like external to the CS 24, the XML communications ports localhost:abc, localhost:def accessing the common cache service 60 via any type of channel or network such as RS423, USB, Ethernet, or the like.

Figure 6:
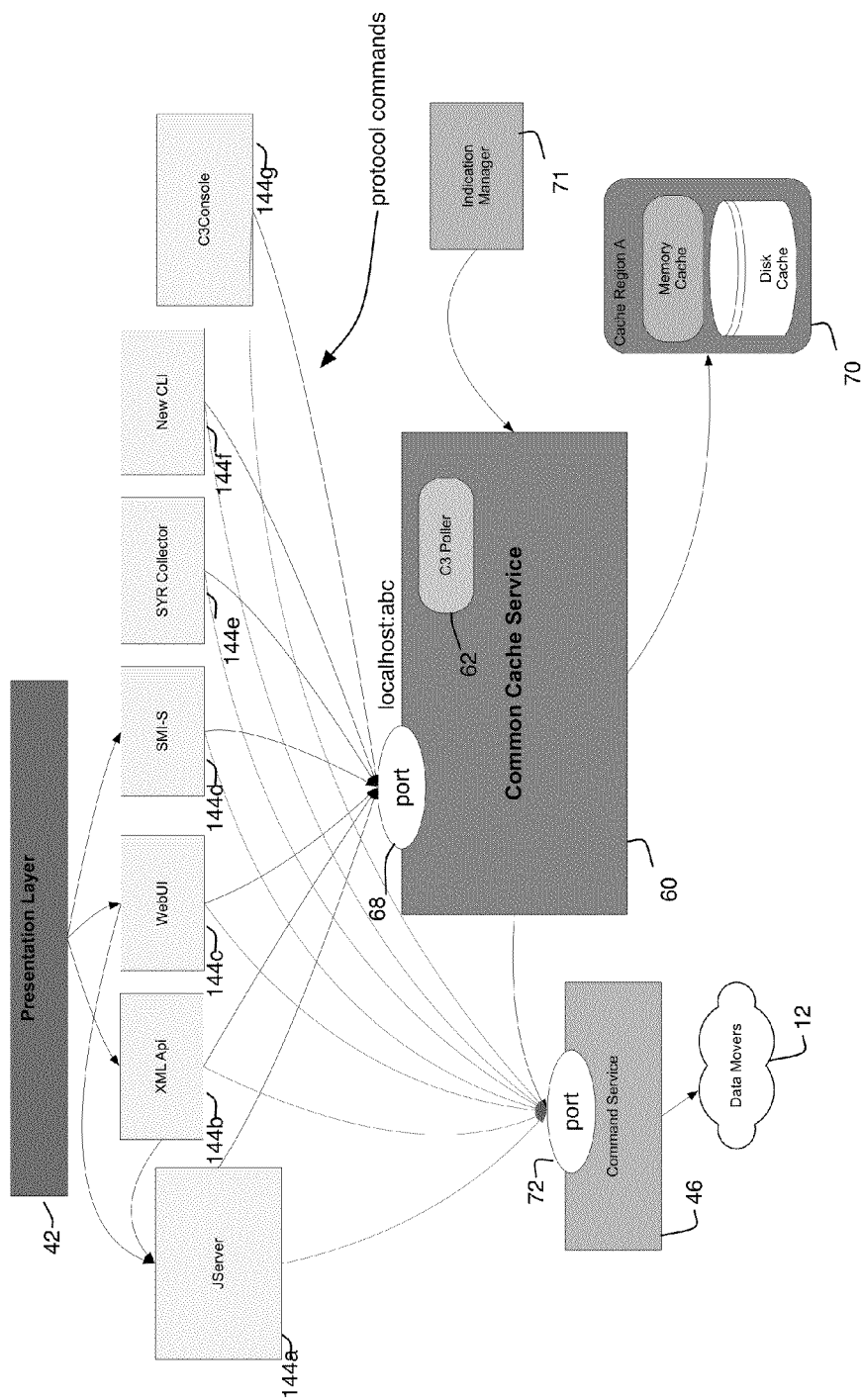
FIG. 6 is a block diagram of an alternate embodiment of a control station embodying a common cache service in accordance with the invention.

In accordance with alternate embodiment of the invention, as shown in FIG. 6, the common cache 60 is implemented in parallel with the command service 46. In this case, protocol commands are sent to different protocol ports depending on the type of command. For example, the common cache service 60 accepts commands on protocol port localhost:abc. The command service accepts commands on port localhost:def. If a request is of a static query type, i.e. the type that is cached, it will be sent to port localhost:abc and thus to the common cache service 60. If a command is of a critical non-static create/delete/update type, it is sent directly to port localhost:def, i.e. directly to the command service 46, without passing through the common cache 60.

Figure 7:
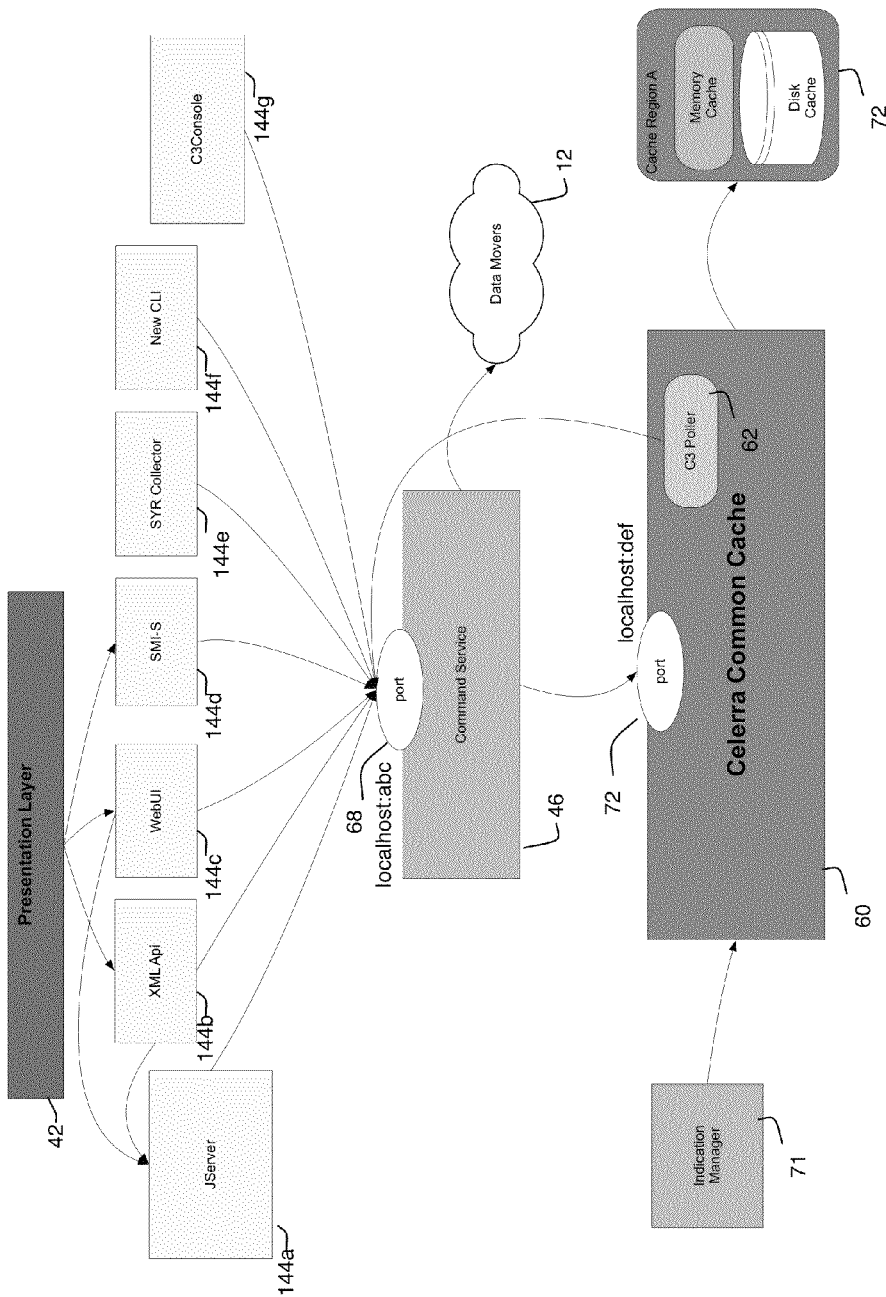
FIG. 7 is a block diagram of another alternate embodiment of a control station embodying a common cache service in accordance with the invention.

In accordance with a third embodiment of the invention, as shown in FIG. 7, the client applications 144 are coupled to the command service 46 such as shown in FIG. 2 on its original port 68. The command service 46 is then coupled to the common cache 60 on port 72. In this case, clients do not communicate directly with the common cache 60 for static queries, but instead access the cached information in the common cache 60 via the command service 46. In this case, in order to populate the common cache 60, the common cache 60 calls back the command service 46 to access the data movers 12. In the alternate embodiments of FIGS. 6 and 7, the common cache service can be implemented remotely as explained with regard to FIG. 5.

Figure 8:
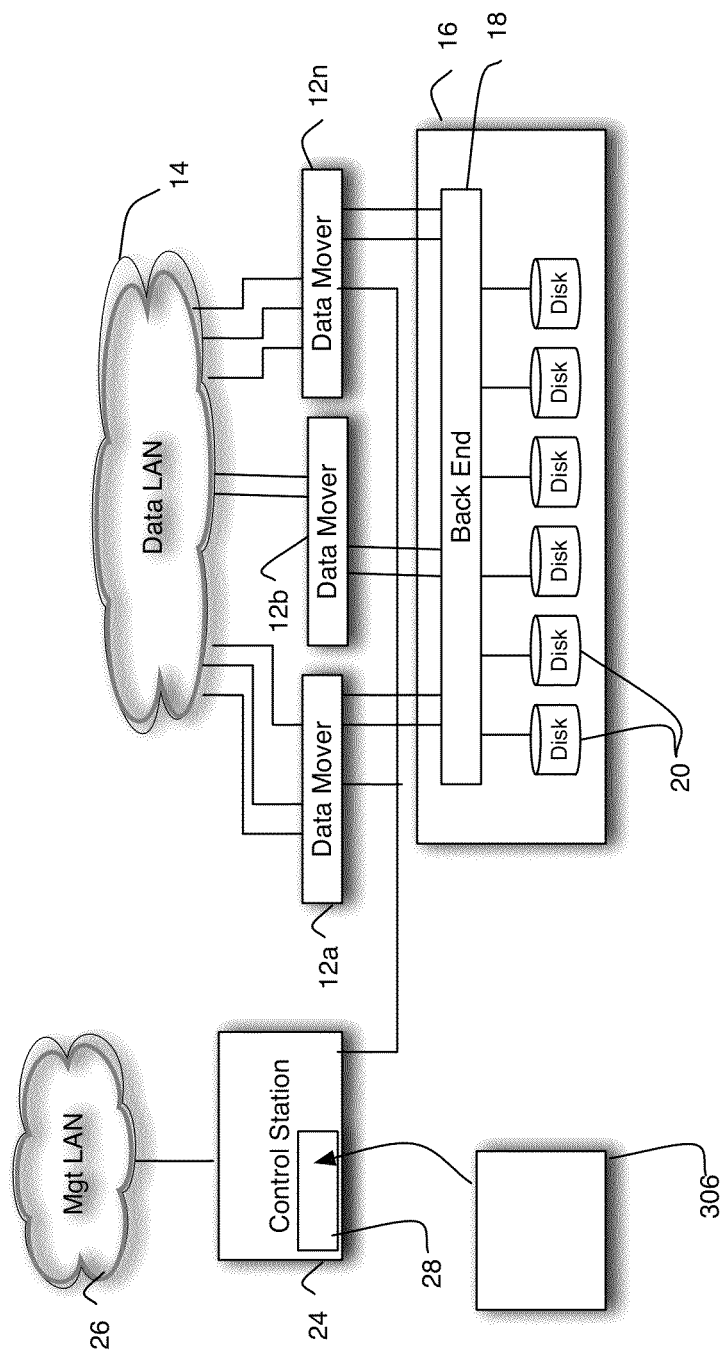
FIG. 8 is a block diagram of a storage system showing a software program product for installing the invention on the control station.

Any of the embodiments of FIGS. 3-7 can be implemented as a computer program product having embodied therein a computer program for storing data. Referring to FIG. 8, the program product may be downloadable to the CS, for example via the management LAN 26, or it may be loadable to the CS via installable media such as a DVD or CD 306 via the media slot 28.

Although the invention has been shown and described with reference to specific preferred embodiments, it should be understood by those skilled in the art that various changes in form and detail may be made therein without departing from the spirit and scope of the invention as defined by the following claims. One skilled in the art will understand that many specific implementations of hardware, software, and combinations thereof can be employed to achieve the logical functionality of the invention. Although the invention has been shown and described with reference to specific preferred embodiments, it should be understood by those skilled in the art that various changes in form and detail may be made therein without departing from the spirit and scope of the invention as defined by the following claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. In a storage system with a data store having a plurality of storage disks, a method of responding to application requests for data comprising the steps of:
    managing the storage system through a control station in communication with the data store, the control station having a plurality of client applications for managing the storage system, each client application, when executed, issuing requests for data from the data store by issuing communications protocol requests to a communications protocol port;
    providing a common cache service coupled between the plurality of client applications and a command service, the command service providing access to the data store, the client applications, command service, and common cache service communicating via a communications protocol;
    receiving by the common cache service a communications protocol request for data from a client application on the communications protocol port;
    returning requested data to the client application if the requested data is stored by the common cache service; otherwise,
        passing the communications protocol request to the command service to retrieve the data from the data store on a different communications protocol port;
        receiving the data from the command service; and
        returning the data to the client application.

2. The method of 1 wherein the step of receiving the data from the command service further comprises the step of storing the received data in the common cache service.

3. The method of claim 1 wherein the step of returning requested data to the client application if the requested data is stored by the common cache service further comprises the step of: checking an auxiliary cache if the data is not found in the common cache service.

4. The method of claim 1 wherein the common cache service is located within the control station of a storage system.

5. The method of claim 1 wherein the common cache service is located remotely to the control station of a storage system.

6. The method of claim 1 wherein the communications protocol is xml based.

7. A program product comprising a non-transitory computer readable medium having embodied therein a computer program for storing data, the program product comprising:
    logic for managing a storage system through a control station in communication with the data store, the logic for managing including a plurality of client applications for managing the storage system, each client application, when executed, issuing requests for data from the data store by issuing communications protocol requests to a communications protocol port;
    a common cache service coupled between the plurality of client applications and a command service, the command service providing access to the data store, the client applications, command service, and common cache service communicating via a communications protocol;
    logic for receiving by the common cache service a communications protocol request for data from a client application on the communications protocol port;
    logic for:
    returning requested data to the client application if the requested data is stored by the common cache service; otherwise,
        passing the communications protocol request to the command service to retrieve the data from the data store on a different communications protocol port;
        receiving the data from the command service; and
        returning the data to the client application.

8. The program product of claim 7 wherein the logic for receiving the data from the command service further comprises logic for storing the retrieved data in the common cache service.

9. The program product of claim 7 wherein the logic for returning requested data to the client application if the requested data is stored by the common cache service further comprises logic for: checking an auxiliary cache if the data is not found in the common cache service.

10. The program product of claim 7 wherein the common cache service is located within the control station of a storage system.

11. The program product of claim 7 wherein the common cache service is located remotely to the control station of a storage system.

12. A storage system comprising:
    a control station coupled to a backend, the backend comprising a data store with a plurality of storage disks, the control station comprising:
    a plurality of client applications for managing the storage system, the client applications issuing requests to the command service to access the data store by issuing communications protocol requests to a communications protocol port;
    a common cache service coupled between the plurality of client applications and a command service, the command service providing access to the data store on the backend, the client applications, command service, and common cache service communicating via a communications protocol;
    the common cache service operable to:
        receive a communications protocol request for data from a client application via a communications protocol on the communications protocol port;
        return the requested data to the client application if the requested data is stored by the common cache service; otherwise,
            pass the communications protocol request to the command service via the communications protocol to retrieve the data from the data store on a different communications protocol port;
            store the retrieved data in the common cache service and
            return the data to the client application.

* * * * *